United States Patent [19]

Hamadani et al.

[11] Patent Number: 6,147,774

[45] Date of Patent: Nov. 14, 2000

[54] MULTIFUNCTION INTERFACE CARD FOR INTERFACING A FACSIMILE MACHINE, SECURE MODEM, AND A PERSONAL COMPUTER

[75] Inventors: Yahya Hamadani, Sunnyvale; Kumar Kumarappan, Fremont, both of Calif.

[73] Assignees: Ricoh Company, Ltd., Tokyo, Japan; Ricoh Corporation, San Jose, Calif.

[21] Appl. No.: 08/987,139

[22] Filed: Dec. 8, 1997

[51] Int. Cl.[7] ....................................................... H04N 1/32
[52] U.S. Cl. .................. 358/442; 379/93.06; 379/100.01
[58] Field of Search ................................... 358/400, 402, 358/407, 403, 442; 395/500; 370/433, 434; 375/222; 379/93.06, 93.02, 93.03, 100.01, 100.05

[56] References Cited

U.S. PATENT DOCUMENTS

| | | | |
|---|---|---|---|
| 4,816,911 | 3/1989 | Kirsch et al. | 358/256 |
| 4,991,200 | 2/1991 | Lin | 358/442 |
| 5,696,600 | 12/1997 | Perkins | 358/442 |
| 5,832,240 | 11/1998 | Larsen et al. | 395/285 |

Primary Examiner—Cheukfan Lee

Attorney, Agent, or Firm—Oblon, Spivak, McClelland, Maier & Neustadt, P.C.

[57] ABSTRACT

A facsimile communication system includes first and second facsimile machines, first and second modems, and a computer. The first facsimile machine includes a multifunction interface that is coupled to the first modem and the computer. The multifunction interface controls transfer of facsimile data from either the facsimile machine or the computer to the first modem with or without processing of the data. For example, the computer may provide data to the multifunction interface in conventional facsimile format using conventional facsimile software and the multifunction interface performs protocol conversion for transmission via the first modem. Alternatively, the computer may include specialized software that provides the conversion into the desired format for transmission via the first modem. In such a case, the multifunction interface passes through the data received from the computer. Likewise, a conventional facsimile machine may provide the data via the multifunction interface which performs any desired protocol conversion. In a receive mode, a second facsimile machine sends data to the first modem which is converted if required by the multifunction interface and the converted data is provided to either the first facsimile machine or the computer.

28 Claims, 5 Drawing Sheets

MULTIFUNCTION INTERFACE CARD FOR INTERFACING A FACSIMILE MACHINE, SECURE MODEM, AND A PERSONAL COMPUTER

BACKGROUND OF THE INVENTION

1. Field of the Invention

The present invention relates to facsimile machines, and more particularly to facsimile transmission from a personal computer through a secure modem.

2. Discussion of the Background

Figure 1:
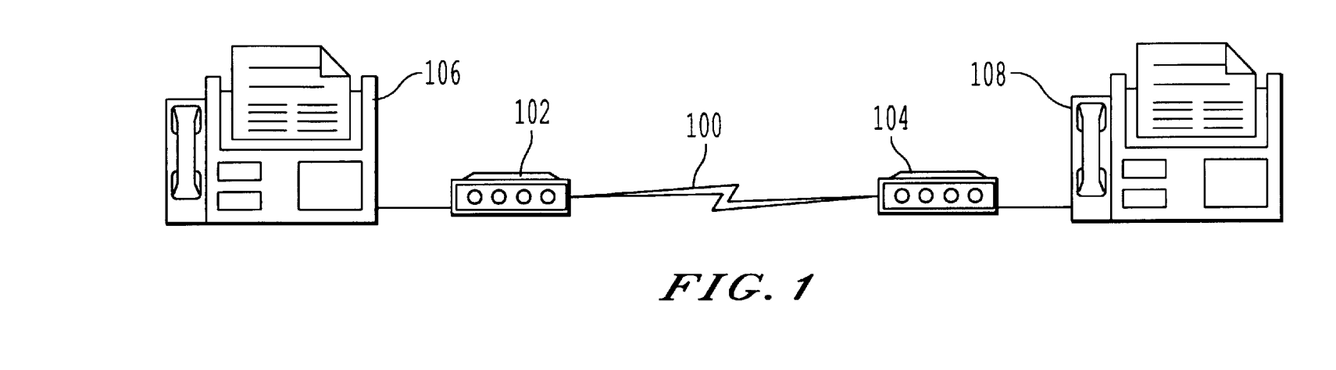
FIG. 1 is a block diagram illustrating a conventional facsimile link using a modem/secure telephone unit interface.

Commercially available digital interfaces provide an interface between a facsimile machine and a modem. The digital interface consists of an RS232 port mounted on a facsimile machine to communicate to external modems aboard secure telephone units (STUs). Normally, these interfaces use standard proprietary protocols for communication. For example, facsimile machines model number SFX80M and model 3500M manufactured by Ricoh are equipped with these interfaces. FIG. 1 is a block diagram illustrating a conventional facsimile communication link using such interfaces. A communication link 100 is coupled to first and second secure telephone units 102 and 104, respectively, each including a modem. First and second facsimile machines 106 and 108, respectively, are coupled to respective secure telephone units 102 and 104.

Figure 2:
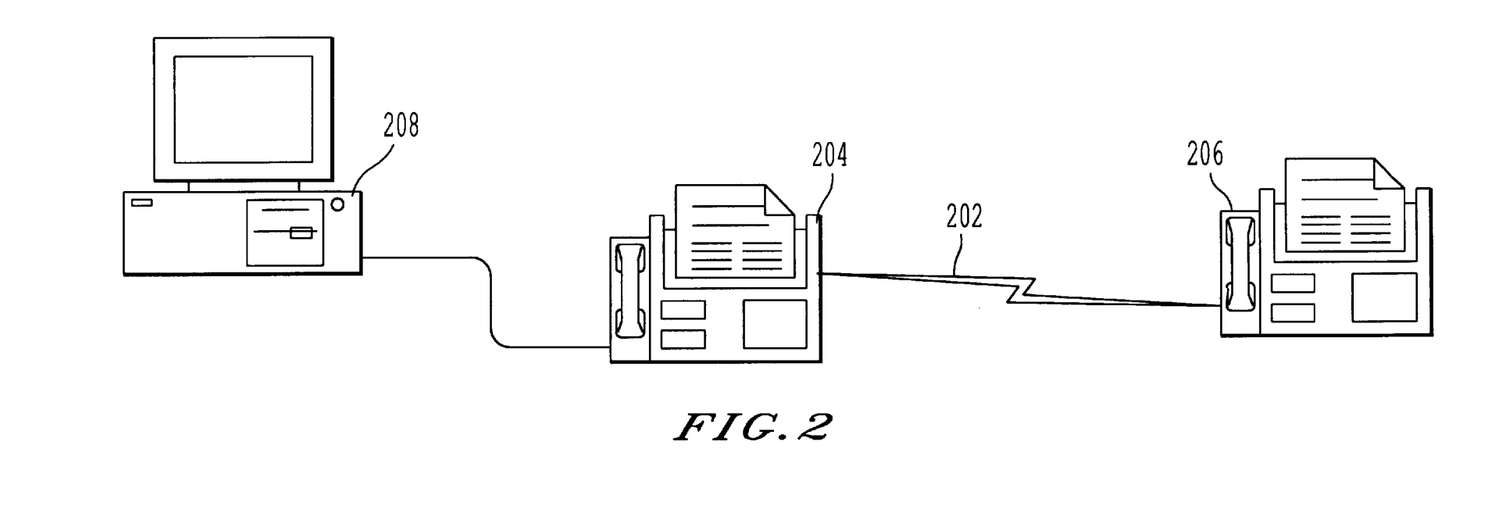
FIG. 2 is a block diagram illustrating a conventional PC facsimile interface.

There are also interfaces in the market that interface personal computers to facsimile machines. These units enable personal computers to use the facsimile machine's external modems to transmit and receive data from telephone lines. FIG. 2 is a block diagram of a conventional system using such interfaces. A communication link 202 is coupled to first and second facsimile machines 204 and 206, respectively. A computer 208 is coupled to the first facsimile machine 204.

However, at the present time, there are no systems for sending a facsimile from a personal computer over a secure modem without purchasing special hardware for the personal computer.

SUMMARY OF THE INVENTION

Accordingly, one object of this invention is to provide a novel interface between facsimile machines, computers and modems. Another object of this invention is to provide a novel interface that selectively routes data between facsimile machines, computers, and modems. Yet another object of this invention is for the novel interface to operate with conventional facsimile machines, computers, and modems without changes to them.

The present invention provides a communication system that includes a communication link, a computer, first and second facsimile machines and an interface card. The first and second facsimile machines are coupled to the communication link. The interface card has a first bi-directional terminal coupled to the first facsimile machine, has a second bi-directional coupled to the computer, and has a third bi-directional terminal coupled to the communication link. The interface card provides data received from the first facsimile machine to the communication link and provides data received from the computer to the communication link. The interface card converts data received from the computer from a first protocol to a second protocol. The first protocol may be, for example, a class I or class II facsimile protocol. A secure modem may be coupled between the communication link and the interface card. The first facsimile machine may include a fourth bi-directional terminal coupled to a telephone line for passing data between the secure modem and the telephone line without processing by the interface card.

The present invention provides a multifunction interface that includes a digital interface, a computer interface, a facsimile interface, and a processor. The digital interface communicates with a modem. The computer interface communicates with a computer. The facsimile interface communicates with a facsimile machine. The processor is coupled to the digital interface, the computer interface, and the facsimile interface. The processor controls data flow between the digital interface, the computer interface, and the facsimile interface. The processor receives a user code and routes data between the computer interface and the facsimile machine interface when the user code is a first number, routes data between the computer interface and the modem interface when the user code is a second number, and routes data between the facsimile machine interface and the modem interface and the user code is a third number. The user code may include a telephone number. The first number may be, for example, an invalid telephone number. The second number may be, for example, an invalid telephone number. The processor may decode the user code into a routing command and a telephone number. The processor may convert data received from the computer from a first protocol to a second protocol.

The present invention also provides a method for communicating between the computer, the facsimile machine, and a modem. A user code is received. Data is routed between the computer and the facsimile machine when the user code is a first number. Data is routed between the computer and the modem when the user code is a second number. Data is routed between the facsimile machine and the modem when the user code is a third number. The user code may include a telephone number. The first number may be, for example, an invalid telephone number. The user code may be decoded into a routing command and a telephone number.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
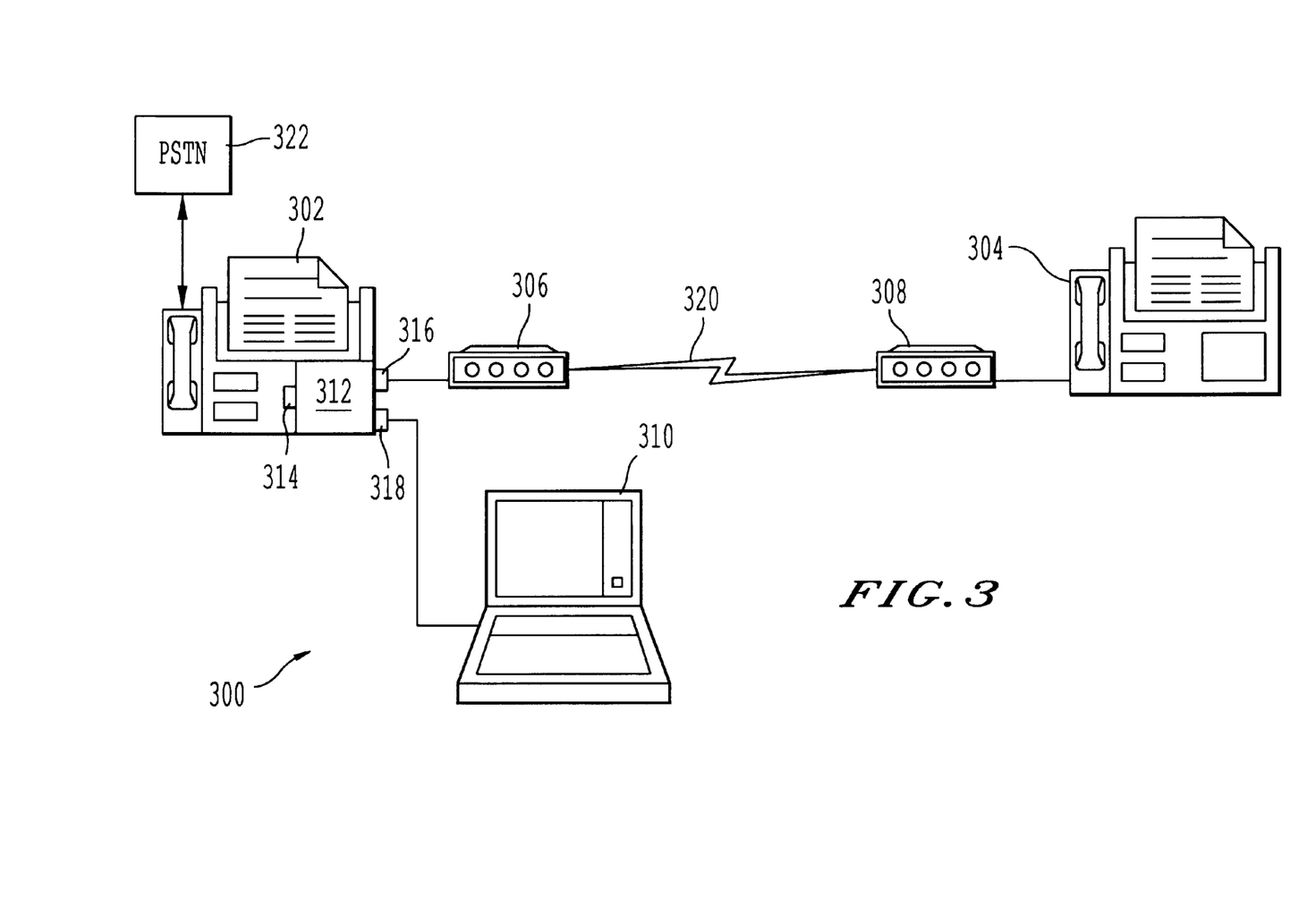
FIG. 3 is a block diagram illustrating a facsimile communication system in accordance with the present invention.

Referring now to the drawings, wherein like reference numerals designate identical or corresponding parts throughout the several views, and more particularly to FIG. 3 thereof, there is illustrated a block diagram of a facsimile communication system 300 in accordance with the present invention. The facsimile communication system 300 includes first and second facsimile machines 302 and 304, respectively, first and second modems 306 and 308, respectively, a computer 310, and a multifunction interface 312.

The multifunction interface 312 includes a facsimile machine bi-directional terminal 314 coupled to the facsimile machine 302, a digital bi-directional terminal 316 coupled to the first modem 306, and a computer bi-directional terminal 318 coupled to the computer 310. In one embodiment of the present invention, the digital bi-directional terminal 316 is an RS232 interface. In one embodiment of the present invention, the computer bi-directional terminal 318 is an RS232 interface. In another embodiment of the present invention, the computer bi-directional terminal 318 is a Personal Computer Memory Card International Association (PCMCIA) interface.

The computer 310 includes facsimile software for converting data from the protocol of the computer 310 to a facsimile protocol and vice versa. The facsimile software may be, for example, Winfax software. The computer 310 may provide data in facsimile format to the first facsimile machine 302 or the first modem 306 via the multifunction interface 312. The computer 310 may be, for example, a conventional laptop computer, such as an IBM compatible or Macintosh PowerBook computer or any other type of computer including a desktop computer.

In one embodiment of the present invention, the facsimile machine 302 includes the multifunction interface 312. In another embodiment of the present invention, the computer 310 includes the multifunction interface 312. In one embodiment of the present invention, the multifunction interface 312 is housed in a PCMCIA card format.

The first and second modems 306 and 308 may be, for example, secure telephone units (STUs). The first and second modems 306 and 308 may be, for example, a model STU III 4100 manufactured by AT&T.

The facsimile communication system 300 also includes a first communication link 320 coupled to the first and second modems 306 and 308. In one embodiment of the present invention, the first communication link 320 is a public switch telephone network (PSTN). In another embodiment of the present invention, the first communication link 320 is a secure digital network. The second modem 308 is coupled to the second facsimile machine 304. The first and second modems 306 and 308 encrypt data for communication over the first communication link 320. The first and second modems 306 and 308 decrypt encrypted data received from the first communication network 320 and converts the encrypted data into a facsimile format for application to the multifunction interface 312.

The first facsimile machine 302 is coupled to a second communication link 322. In one embodiment of the present invention, the second communication link 322 is a public switch telephone network (PSTN).

The multifunction interface 312 simultaneously processes multiple types of communications of data between the facsimile machine interface 314, the digital interface 316, and the computer interface 318. The multifunction interface 312 selectively communicates data between the first facsimile machine 302, the first modem 306, and the computer 310. The multifunction interface 312 may also convert the protocol or format of the data.

In one mode of operation, the multifunction interface 312 receives incoming facsimiles from the first modem 306, which may be routed to either the first facsimile machine 302 or the computer 310 in response to user commands. Specifically, the first facsimile machine 302 may be instructed to print the incoming facsimile, or to transfer the facsimile to the second communication link 322. Alternatively, the multifunction interface 312 may route incoming facsimiles from the first communication link 320 directly to the computer 310, which may store the facsimile on disk. This routing to the computer 310 may be done in response to a user command or may be done automatically, for example, when the first facsimile machine 302 is out of paper.

In another mode of operation, the multifunction interface 312 receives facsimiles from the first facsimile machine 302 which may be routed to either the first modem 306 or the computer 310 in response to user commands. Specifically, the multifunction interface 312 may route facsimile data from the first facsimile machine 302 to the computer 310. Thus, in this mode, the first facsimile machine 302 operates as a scanner. Alternatively, the multifunction interface 312 may route incoming faxes from the first facsimile machine to the first modem 306 for transmission over the first communication link 320 to a destination modem 308.

In yet another mode of operation, the multifunction interface 312 receives incoming facsimiles from the computer 310, which may be routed to either the first facsimile machine 302 or the first modem 306 in response to user commands. Specifically, the first facsimile machine 302 may be instructed to print the facsimile. In this mode, the computer 310 selectively provides facsimile data to the first facsimile machine 302 for printing. Thus, in this mode, the first facsimile machine 302 operates as a printer. Alternatively, the computer may instruct the multifunction interface 312 to transmit data to the first modem 306.

When the computer 310 is to transmit data, the computer 310 may dial directly through the first facsimile machine 302 and transmit the data.

In one embodiment of the present invention, the computer 310 executes conventional fax application programs. The user enters a number into the computer 310 for directing the facsimile data such as a telephone call. Predetermined numbers are used for commanding the first modem 306 to transmit data through the first communication link 320 or to print data directly on the facsimile machine 302 or to transmit data over the second communication link 322. In one embodiment of the present invention, these functions are assigned to telephone numbers that are invalid. In such an embodiment, the multifunction interface 312 decodes these invalid numbers to selectively control the data flow 310.

The modems 306 and 308 may provide data in a secure protocol. In one embodiment of the invention, the secure protocol may be selected from one of four communication protocols which are used in communicating between secure modems including Mil-Std-188-16, compatible, Ricoh, and Asynchronous protocols, although other protocols may be used, if desired. The facsimile machine 302 may select the protocol in response to user commands.

In one embodiment of the present invention, the modems 306 and 308 have a remote operation mode in which the modems 306 and 308 call each other and synchronize with each other. After such synchronization, the modems 306 and 308 send an authentication code and after the authentication is established, then data may be transmitted between the modems 306 and 308. The computer 310 may do the authentication. Alternatively, the user may still maintain control of the authentication specifically the user enters the authentication code via the computer 310 or authentication will be handled by the multifunction interface 312.

The computer 310 may directly send data via the multifunction interface 312 to the first modem 306 without operation from the facsimile machine 302. In one embodiment of the present invention, the facsimile machine 302 may monitor the transmission and provide such monitored data in a report.

Figure 4:
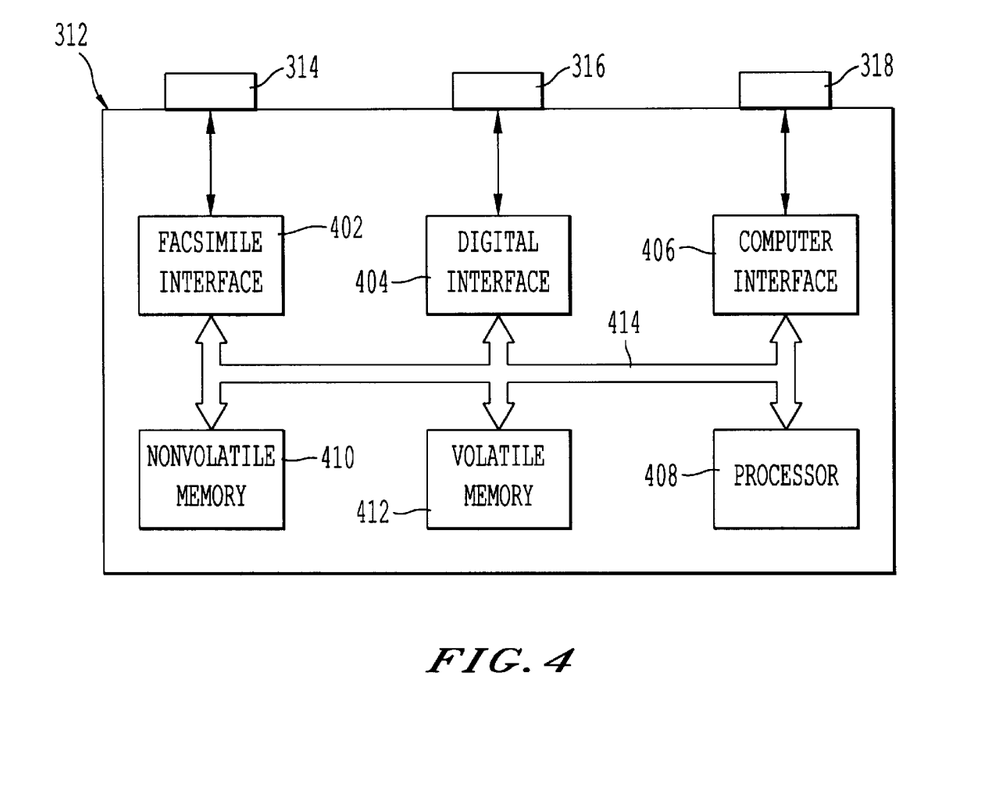
FIG. 4 is a block diagram illustrating multifunction interface in accordance with the present invention.

FIG. 4 is a block diagram illustrating the multifunction interface 312 in accordance with the present invention. The multifunction interface 312 includes the facsimile bi-directional terminal 314, the digital bi-directional terminal 316, the computer bi-directional terminal 318, a facsimile interface 402, a digital interface 404, a computer interface 406, a processor 408, a nonvolatile memory 410, a volatile memory 412, and a bus 414.

The facsimile interface 402 is coupled to the first facsimile machine 302 and the facsimile bi-directional terminal 314. The digital interface 404 is coupled to the first modem 306 and to the digital bi-directional terminal 316. The computer interface 406 is coupled to the computer 310 and to the computer bi-directional terminal 318. The processor 408 may be, for example, a model number SN80C188XL20 central processing unit manufactured by Intel Corporation of Santa clara, Calif.

The bus 414 is coupled to the facsimile interface 402, the digital interface 404, the computer interface 406, the processor 408, the nonvolatile memory 410, and the volatile memory 412 for communication of data, addresses and control signals there between. The nonvolatile memory 410 stores computer programs for controlling the operation of the multifunction interface 312. The computer programs convert data between protocols, and also controls the routing of the data. In one embodiment of the present invention, the nonvolatile memory 410 is flash memory. The nonvolatile memory 410 may be, for example, a model number AM29F002T flash memory manufactured by AMD. However, any other type of nonvolatile memory may be used including an electrically erasable programmable read only memory (EEPROM). In one embodiment of the present invention, the volatile memory 412 is random access memory (RAM). The volatile memory 412 may be, for example, a model number CXK581001M-70LL static RAM manufactured by Sony. The volatile memory 412 stores application software, data, programming parameters, and the like.

The facsimile machine interface 402, the digital interface 404, and the computer interface 406 are each independent. In one embodiment of the present invention, each interface independently communicates through the interface without input or feedback from the other interfaces. The interfaces may, however, notify the other interfaces when the communication is completed. Such notification may be through one or a series of commands such as the "busy" command. The facsimile machine interface 402, the digital interface 404, and the computer interface 406 operate as serial communication controllers. In one embodiment of the present invention, the facsimile machine interface 402, the digital interface 404, and the computer interface 406 include a model number AM85233-16 serial communication controller manufactured by Advanced Micro Devices of Santa Clara, Calif. These interfaces may also include drivers such as model number MAX207CAG manufactured by Maxim of Sunnyvale Calif.

The processor 408 selectively communicates data between the facsimile interface 402, the digital interface 404, and the computer interface 406. The processor 408 may also convert the protocol or format of the data. In one mode of operation, the processor 408 may route incoming facsimiles from the first communication link 320 and the modem 306 via the digital bi-directional terminal 312 and the digital interface 404 to the computer interface 406 for communication with the computer 310. This routing may be done in response to user commands or may be done automatically. The processor 408 also may route incoming faxes from the modem 306 to the facsimile interface 402 for printing. In another mode of operation, the processor 408 may route facsimile data from the facsimile interface 402, which is received from the first facsimile machine 302, to the computer interface 406 for communication with the computer 310 or to the digital interface 404 for communication with the first modem 306. In yet another mode of operation, the processor receives data from the computer 310 via the computer interface 406 which may be routed to either the first facsimile interface 402 for printing by the first facsimile machine 302 or to the digital interface 404 for communication with the first modem 306.

In one embodiment of the present invention, the processor 402 selectively passes data from either the computer 310 or the secure modem 306 to the facsimile machine terminal 314 in response to a user command. The user command may be input either through the computer 310 or the first facsimile machine 302. The processor 408 also passes communications from the secure modem 306 to the facsimile machine 302 to the second communication line 322 or vice versa. Thus, the first facsimile machine 302 includes a telephone interface, connected to the first bi-directional terminal 314 for outputting and communicating data from the first modem 306 which is a secure modem to the second communication line 322 which is a public switched telephone network, for example.

When the computer 310 is to transmit data, the computer 310 provides a user code to the processor 408 which decodes the user code. In a mode in which the computer interface 406 is to provide data to the first modem 306 via the digital interface 404, the facsimile interface 402 and the first facsimile machine 302 are bypassed and data is directly routed between the computer 310 and the first modem 306. In an embodiment in which the multifunction interface 312 is in the first facsimile machine 302, the facsimile machine 302 operates merely as a host.

In an embodiment in which the multifunction interface 312 is in the first facsimile machine 302, the first facsimile machine 302 operates as a master to the multifunction interface 312. In such an embodiment, the processor 408 may operate independently of the first facsimile machine 302 but the processor 408 receives mode and operational commands from the first facsimile machine 302. Also in such an embodiment, the user may access the multifunction interface via the first facsimile machine 302 such as by push buttons on the face of the first facsimile machine 302. Specifically, the multifunction interface 312 allows the facsimile machine 302 to communicate with the modem 306. The facsimile 302 communicates with the modem 306 in a conventional manner by providing data in digital facsimile format or one of the four protocols described above used in communicating between secure modems.

The computer interface 406 is a bi-directional port for coupling to the computer 310. The computer 310 transmits and receives data from the multifunction interface 312. For example, the computer 310 transmits facsimile class II signals to the multifunction interface 312. The multifunction interface 312 then converts these class II protocol signals to one of four different communication protocols which are used in communications over the modem 306. The computer 310 receives facsimile class II signals from the multifunction interface 312. Specifically, the second facsimile machine 304 sends a facsimile through the second modem 308, the communication link 320, and the first modem 306 to the multifunction interface 312. The multifunction interface 312 may then send facsimile data either to the first facsimile machine 302 or to the computer 310.

A major advantage of the system of the present invention is that the computer 310 may use the first modem 306 without the purchase of additional equipment or software for the computer 310. The multifunction interface 312 which receives the class I class II signals from the computer 310 performs a protocol conversion and outputs the signal to the modem 306. The multifunction interface 312 includes extensive functional capabilities for communication between the computer 310, the first facsimile machine 302, and the first modem 306.

Figure 5:
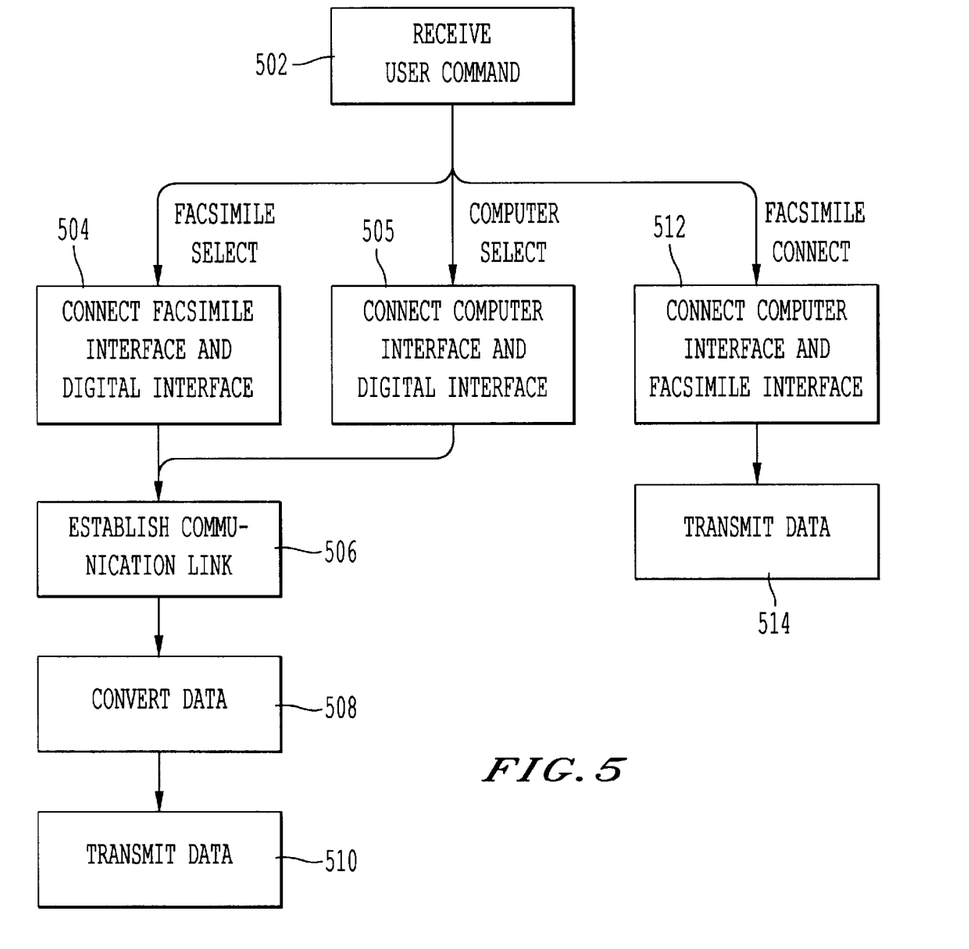
FIG. 5 is a flowchart illustrating the data transfer operation of the multifunction interface of FIG. 4 in accordance with the present invention.

FIG. 5 is a flowchart illustrating the data transfer operation of the multifunction interface 312 in accordance with the present invention. The multifunction interface 312 receives a user command for selecting how the facsimile data is to be transmitted (block 502). The user command may be either a facsimile select command indicating that the first facsimile machine 302 is providing the data, a computer select command indicating that the computer 310 may provide the data, or a facsimile connect command indicating that the computer 310 is providing data to the first facsimile machine 302. In one embodiment of the present invention, the user command is an invalid telephone number for a computer select or facsimile connect commands. In yet another embodiment of the present invention, the user command may be affixed to the destination telephone number as a header, preamble, or postamble.

If the user command is a facsimile select command (block 502), the processor 408 connects the facsimile interface 402 to the digital interface 404 for communicating data there between. On the other hand, if the user command is a computer select command (block 502), the processor 408 connects the computer interface 406 to the digital interface 404 for communication (block 505). The processor 408 sends a command to the digital interface 404 to establish a communication link through the first modem 306 to the modem 308. The establishment of the communication link may be conventional. When the data provided by either the facsimile machine 302 or the computer 310 requires conversion, the processor 408 converts the data from the received format to the desired format for communication via the first modem 306 (block 508). After establishing the communication link and converting the data, the processor 408 controls the transfer of data from either the facsimile interface 402 or the computer interface 406 to the digital interface 404 for transmission of the data via the modem 306.

If the user command is a facsimile connect command (block 502), the processor 408 connects the computer interface 406 to the facsimile interface 402 for communicating data there between. The processor 408 controls the transfer of data from either the computer interface 406 to the facsimile interface 402. In one embodiment of the present invention, the facsimile connect command is used for transferring data from the computer 310 to the first facsimile machine 302 for printing the data by the first facsimile machine 302.

Figure 6:
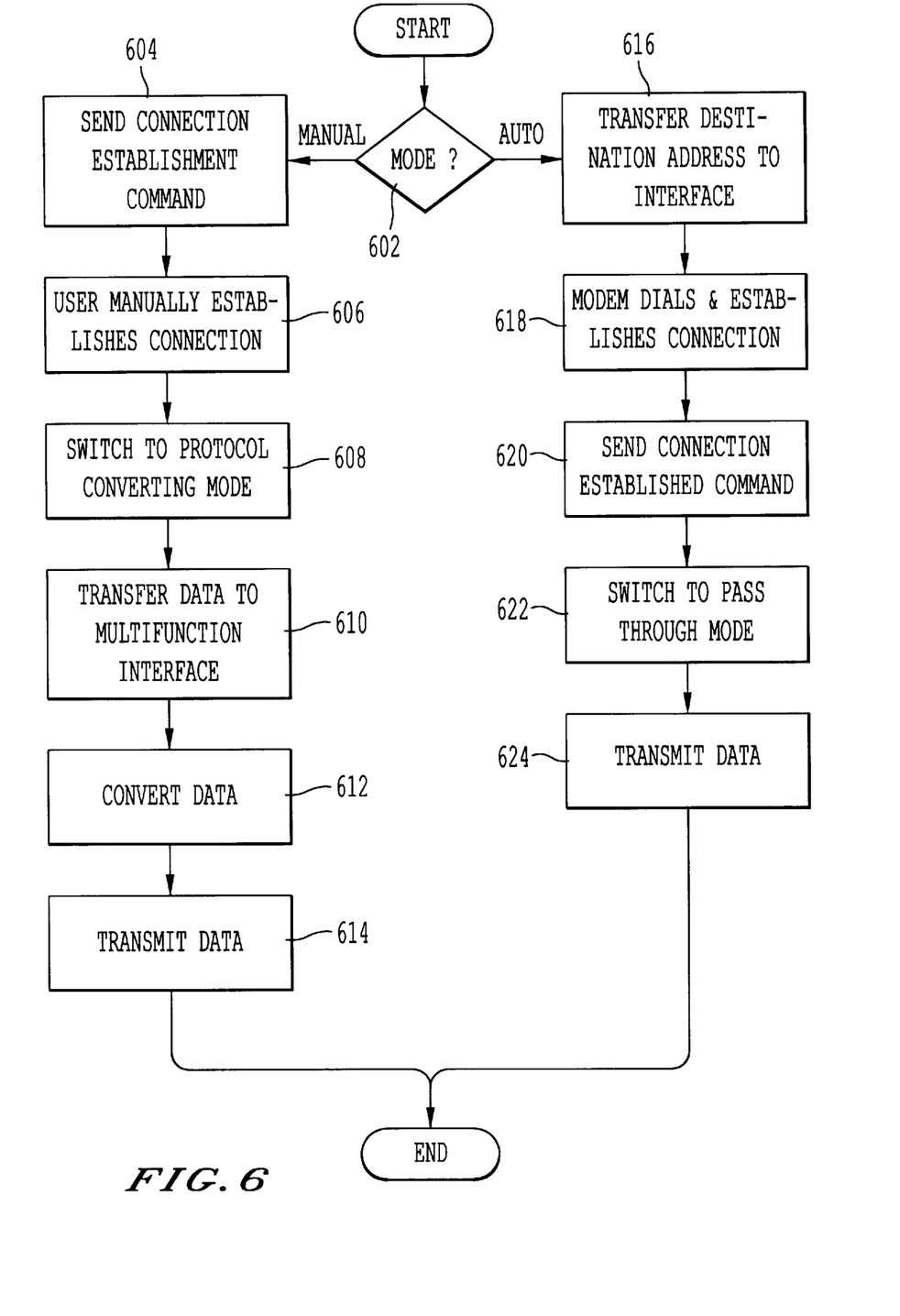
FIG. 6 is a flowchart illustrating the operation of the automatic and manual modes of the facsimile communication system of FIG. 3 in accordance with the present invention.

FIG. 6 is a flowchart illustrating the operation of the automatic and manual modes of the facsimile communication system 300 in accordance with the present invention. The facsimile communication system 300 may operate in either a manual mode or an automatic mode. In the manual mode, the multifunction interface 312 controls the first modem 306 for establishing a communication link with the destination modem 308, and the user maintains control of the operation. The multifunction interface 312 also converts the data into the appropriate protocol and transmits the data via the first modem 306. In the automatic mode, the multifunction interface merely establishes the connection via the first modem 306 and passes through data from the computer 310. The computer 310 establishes the authentication.

In particular, the multifunction interface 312 is set to either a manual mode or automatic mode by, for example, a command from the computer 310 or by a mechanical switch on the facsimile machine 302 (block 602). In one embodiment of the present invention, the command is affixed to the telephone number of the destination modem 308. The command may be, for example, a one or two star (or asterisk) symbol affixed as a prefix to the telephone number. If the command is a single star symbol, the desired mode is an automatic mode and if two star symbols are entered without numbers, the mode is the manual mode. In the manual mode, the computer 310 sends a connection establishment command to the multifunction interface 312 to request that the multifunction interface 312 establish a communication link between the modem 306 and a destination modem 308 (block 604). The multifunction interface 312 establishes a connection via the modem 306 to the destination 308 by transmitting an authentication code and verifying the code (block 606). In the manual mode, the user enters the telephone number into the first modem 306 which dials the selected second modem 308. Thus, the user manually establishes the connection. The multifunction interface 312 switches to a protocol converting mode in which the protocol data from the computer 310 is converted into a facsimile protocol for communication via the modem 306 (block 608). Such conversion is typically into one of four secure protocols. The computer 310 transfers data to the multifunction interface 312 (block 610). The multifunction interface 312 converts the data from the class II facsimile format to one of the four secure protocols (block 612). The multifunction interface 312 transmits the data to the modem 306 (block 614).

In the automatic mode, the computer 310 transfers a destination address to the multifunction interface 312 (block 616). The destination address may be, for example, the telephone number of the destination modem 308. The multifunction interface 312 establishes connection via the modem 306 to the destination modem 308 by transferring an authentication code received from the computer 310 to the modem 306 (block 618). In block 618, the modem dials and establishes the connection automatically. The multifunction interface 312 sends a connection established command to the computer 310 indicating that the connection between the modems 306 and 308 has been established (block 620). The multifunction interface 312 switches to a pass-through mode in which data from the computer 310 is provided to the modem 306 without processing or data conversion by the multifunction interface 312 (block 622). The computer 310 transmits data to the modem 306 via the pass through capability of the multifunction interface 312 (block 624).

The multifunction interface 312 of the present invention provides an integrated interface for selectively routing facsimile data from the computer 310 to either the facsimile machine 302 or the modem 306 from the modem 306 to either the computer 310 or the facsimile machine 302 or from the facsimile machine 302 to either the modem 306 or the computer 310. The multifunction interface 312 allows the user to control the data flow from either the facsimile machine 302 or the computer 310. This provides a single interface card usable with conventional facsimile machines, modems, and computers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A communication system comprising:
    a communication link;
    a computer;
    a first facsimile machine coupled to the communication link;
    a second facsimile machine coupled to the communication link; and
    an interface card having a first bi-directional terminal coupled to the first facsimile machine, having a second bi-directional terminal coupled to the computer, and having a third bi-directional terminal, distinct from said first bi-directional terminal, coupled to the communication link, said third bi-directional terminal being a digital interface, the interface card providing data received from the first facsimile machine to the communication link and providing data received from the computer to the communication link,
    wherein the interface card is operable in a pass-through mode in which data from the computer is provided to the third bi-directional terminal without processing or data conversion.

2. The communication system of claim 1, wherein when not operating in the pass-through mode the interface card converts data received from the computer from a first protocol to a second protocol.

3. The communication system of claim 2, wherein the first protocol is one of a Class I and Class II facsimile protocol.

4. The communication system of claim 1 further comprising a secure modem coupled between the communication link and the interface card.

5. The communication system of claim 4, wherein when not operating in the pass-through mode the interface card converts data received from the computer from a first protocol to a second protocol.

6. The communication system of claim 5, wherein the first protocol is one of a Class I and a Class II facsimile protocol.

7. The communication system of claim 4, wherein the first facsimile machine further comprises:
    a telephone interface, connected to the first bi-directional terminal, which outputs data from the secure modem.

8. The communication system according to claim 1, wherein the interface card further includes a facsimile interface connected to the first bi-directional terminal, a computer interface connected to the second bi-directional terminal, and a digital interface connected to the third bi-directional terminal, and each of the facsimile interface, the computer interface, and the digital interface is a serial communication controller.

9. A method for communicating between a computer, a facsimile machine, and a modem, comprising the steps of:
    receiving a user code;
    routing data between the computer and the facsimile machine when the user code is a first number;
    routing data between the computer and the modem through digital interface when the user code is a second number, wherein such routing is operable in a pass-through mode in which data from the computer is provided to the modem without processing or data conversion; and
    routing data between the facsimile machine and the modem when the user code is a third number.

10. The method of claim 9 wherein the user code includes a telephone number.

11. The method of claim 9 wherein the first number is an invalid telephone number.

12. The method of claim 9 further comprising the step of decoding the user code into a routing command and a telephone number.

13. The method of claim 9, wherein each of the routing of data is by a serial communication controller.

14. A multifunction interface comprising:
    a digital interface for communicating with a modem;
    a computer interface for communicating with a computer;
    a facsimile machine interface for communicating with a facsimile machine; and
    a processor coupled to the digital interface, the computer interface, and the facsimile interface for controlling data flow directly between the digital interface, the computer interface, and the facsimile machine interface, wherein such data flow is operable in a pass-through mode in which data from the computer is provided to the modem through the digital interface without processing or data conversion.

15. The multifunction interface of claim 14, wherein the processor has an input for receiving a user code, and
    routes data between the computer interface and the facsimile machine interface when the user code is a first number, routes data between the computer interface to the modem interface when the user code is a second number, and routes data between the facsimile machine interface and the modem interface when the user code is a third number.

16. The multifunction interface of claim 14, wherein the user code is included in a telephone number.

17. The multifunction interface of claim 14, wherein the first number is an invalid telephone number.

18. The multifunction interface of claim 14, wherein the processor decodes the user code into a routing command and a telephone number.

19. The multifunction interface of claim 14, wherein when not operating in the pass-through mode the processor converts data received from the computer from a first protocol to a second protocol.

20. The multifunction interface of claim 14, wherein the first protocol is one of a Class I and Class II facsimile protocol.

21. The multifunction interface of claim 14, wherein each of the facsimile machine interface, the computer interface, and the digital interface is a serial communication controller.

22. A facsimile machine comprising:
    a multifunction interface including a digital interface for communicating with a modem, a computer interface for communicating with the computer, and a processor coupled to the digital interface and the computer interface for controlling data flow directly between the digital interface, the computer interface, and the facsimile machine interface, wherein such data flow is operable in a pass-through mode in which data from the computer is provided to the modem through the digital interface without processing or data conversion.

23. The facsimile machine of claim 22, wherein the processor has an input for receiving a user code, and
routes data between the computer interface and the facsimile machine interface when the user code is a first number, routes data between the computer interface to the modem interface when the user code is a second number, and routes data between the facsimile machine interface and the modem interface when the user code is a third number.

24. The facsimile machine of claim 22, wherein the user code is included in a telephone number.

25. The facsimile machine of claim 22, wherein the first number is an invalid telephone number.

26. The facsimile machine of claim 22, wherein the processor decodes the user code into a routing command and a telephone number.

27. The facsimile machine of claim 22, wherein when not operating in the pass-through mode the processor converts data received from the computer from a first protocol to a second protocol.

28. The facsimile machine according to claim 22, wherein each of the facsimile machine interface, the computer interface, and the digital interface is a serial communication controller.

* * * * *